United States Patent
Sculthorpe et al.

(10) Patent No.: US 10,454,352 B1
(45) Date of Patent: Oct. 22, 2019

(54) METHOD OF PRODUCING A LAMINATED MAGNETIC CORE

(71) Applicant: WILLIAMS INTERNATIONAL CO., L.L.C., Walled Lake, MI (US)

(72) Inventors: David A. Sculthorpe, White Lake, MI (US); Geoffrey R. Madden, Plymouth, MI (US)

(73) Assignee: WILLIAMS INTERNATIONAL CO., L.L.C., Pontiac, MI (US)

(*) Notice: Subject to any disclaimer, the term of this patent is extended or adjusted under 35 U.S.C. 154(b) by 328 days.

(21) Appl. No.: 15/583,363

(22) Filed: May 1, 2017

Related U.S. Application Data

(60) Provisional application No. 62/330,281, filed on May 2, 2016.

(51) Int. Cl.
H02K 15/02 (2006.01)

(52) U.S. Cl.
CPC .................... H02K 15/02 (2013.01)

(58) Field of Classification Search
CPC .................................................... H02K 15/02
See application file for complete search history.

(56) References Cited

U.S. PATENT DOCUMENTS

| | | |
|---|---|---|
| 3,095,333 A | 6/1963 | Sweeney et al. |
| 3,110,831 A | 11/1963 | Zimmerle |
| 3,202,851 A | 8/1965 | Zimmerle et al. |
| 3,686,043 A | 8/1972 | Broyles et al. |
| 3,694,903 A | 10/1972 | Deming |
| 3,725,832 A | 4/1973 | Schweitzer, Jr. |
| 3,834,013 A | 9/1974 | Gerstle |
| 4,013,910 A | 3/1977 | Deming |
| 4,615,106 A | 10/1986 | Grimes et al. |
| 5,919,319 A | 7/1999 | Couderchon |
| 6,193,903 B1 | 2/2001 | Gay et al. |

(Continued)

FOREIGN PATENT DOCUMENTS

| | | |
|---|---|---|
| GB | 637900 A | 3/1948 |
| GB | 1522425 A | 8/1978 |

(Continued)

*Primary Examiner* — Carl J Arbes
(74) *Attorney, Agent, or Firm* — Raggio & Dinnin, P.C.; Kurt L. VanVoorhies

(57) ABSTRACT

A magnetic core is assembled from a plurality of electrical-steel laminations staked together by respective plug and socket portions of respective adjacent interlocks at locations that experience relatively-low magnetic flux density rate. An electrically-insulating-coating is placed on abutting lamination surfaces either before or after blanking the laminations, or after partially piercing the interlocks, prior to stacking and pressing the laminations together to form the magnetic core. The magnetic core is annealed in a non-oxidizing environment at a first temperature for a first period of time, and then cooled to a second temperature at a controlled rate of cooling. The first temperature is sufficiently high to prospectively cause fusion between adjacent laminations if not protected by the electrically-insulating-coating. The annealed magnetic core is heated in an oxidizing environment at a third temperature for a second period of time to develop one or more oxide layers between each pair of adjacent laminations.

12 Claims, 14 Drawing Sheets

(56) References Cited

U.S. PATENT DOCUMENTS

| | | |
|---|---|---|
| 8,288,913 B1 | 10/2012 | Bourquin et al. |
| 2013/0269665 A1 | 10/2013 | Bender |
| 2015/0364250 A1 | 12/2015 | Bender |

FOREIGN PATENT DOCUMENTS

| | | | |
|---|---|---|---|
| IN | 2011MU01045 A | | 11/2011 |
| JP | 03032890 B | * | 5/1991 |
| JP | 5067048 B | * | 9/1993 |
| WO | 200249190 A1 | | 6/2002 |

* cited by examiner

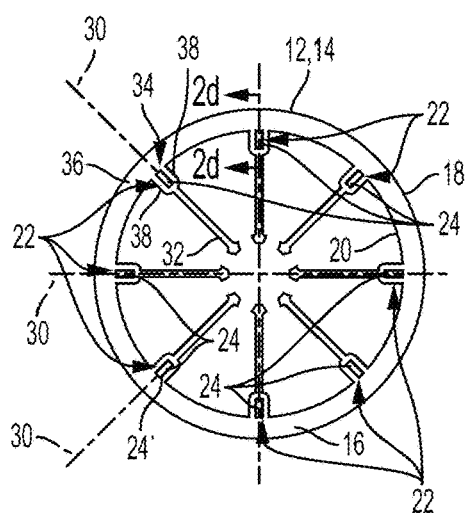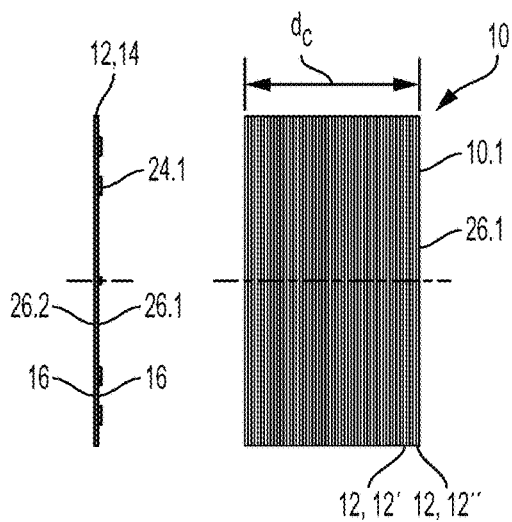
FIG. 3a  FIG. 3b  FIG. 3e
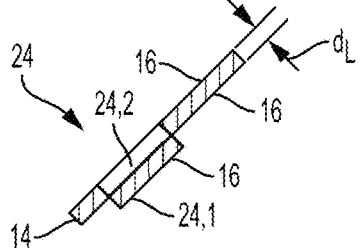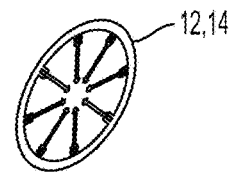
FIG. 3d  FIG. 3c
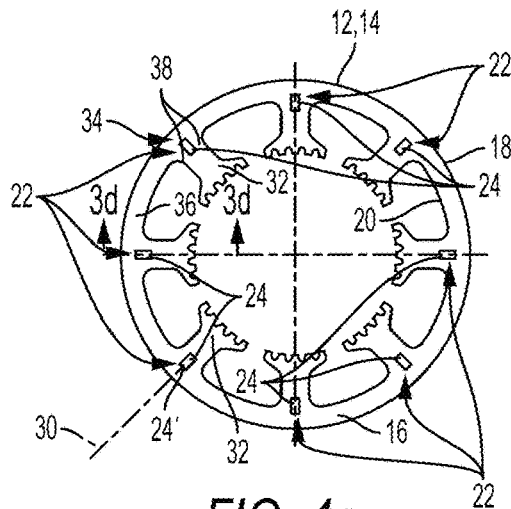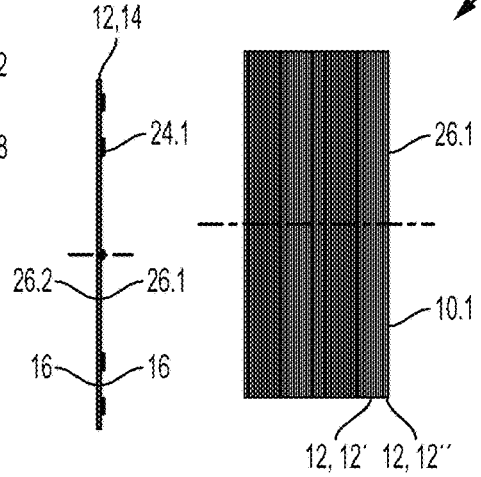
FIG. 4a  FIG. 4b  FIG. 4e
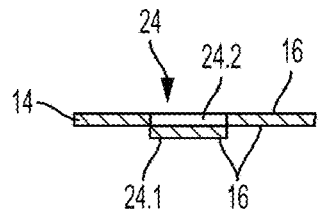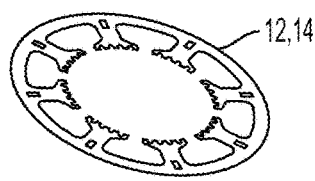
FIG. 4d  FIG. 4c

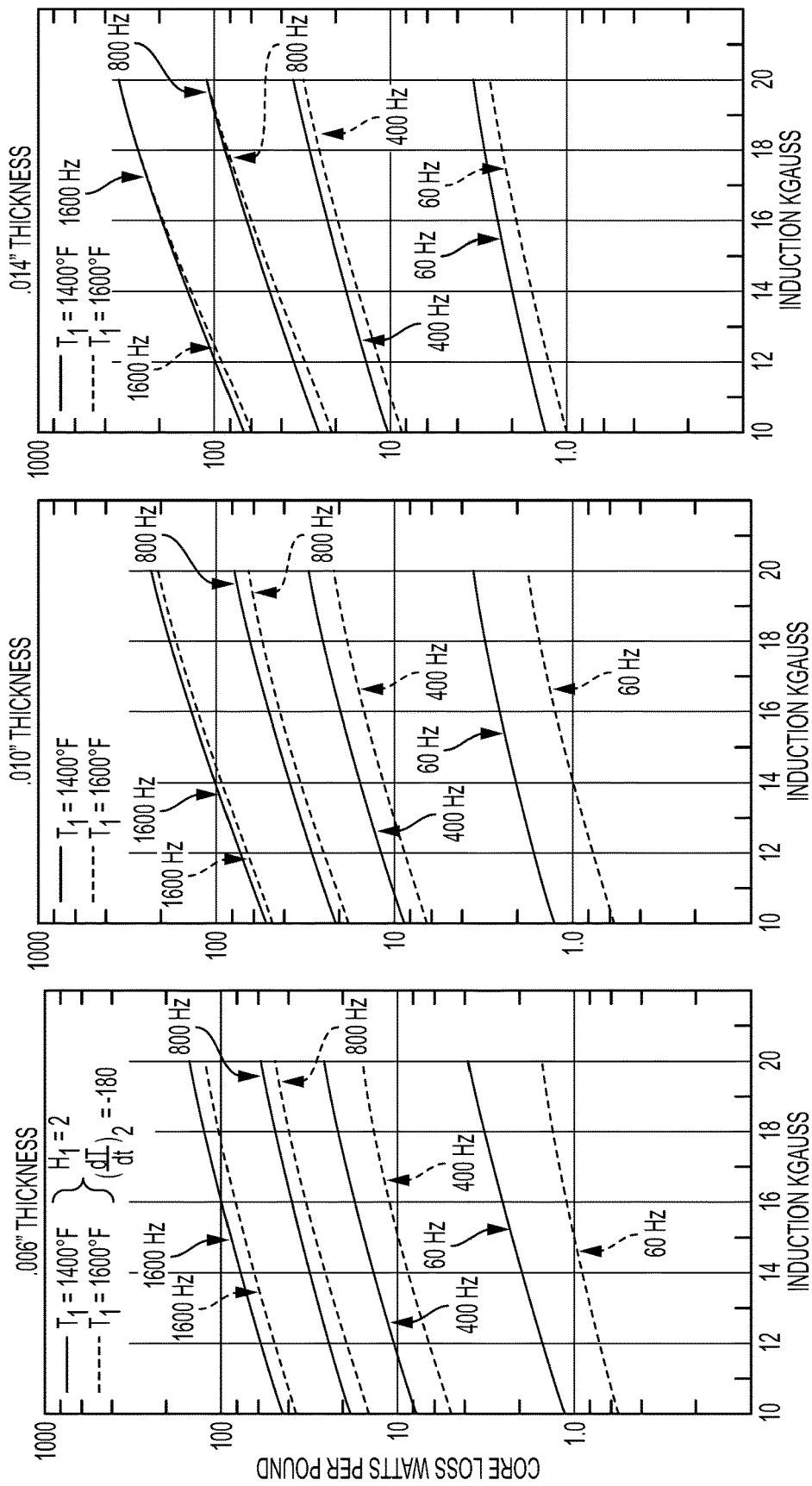

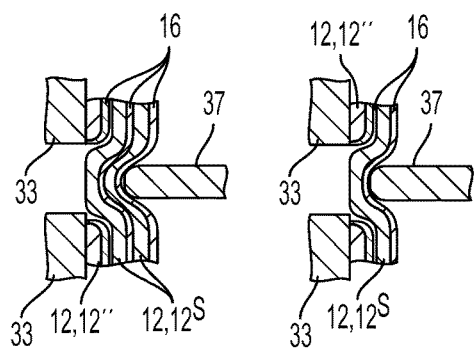
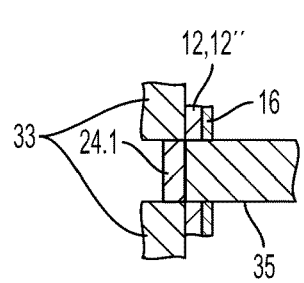
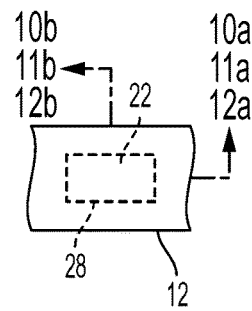
FIG. 12a  FIG. 11a  FIG. 10a  FIG. 9
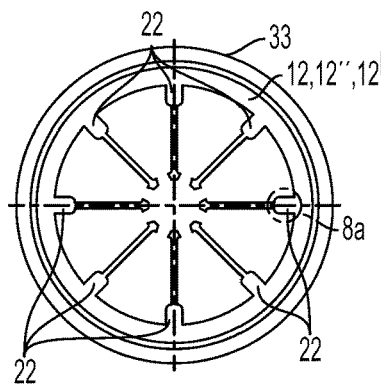
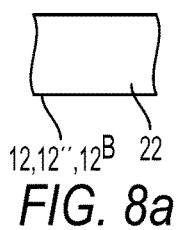
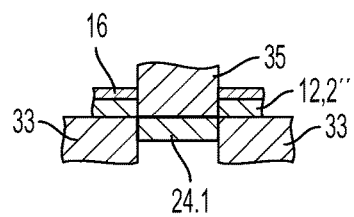
FIG. 7a  FIG. 8a  FIG. 10b
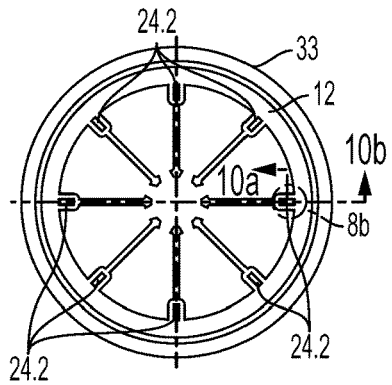
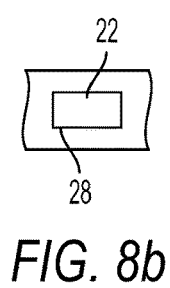
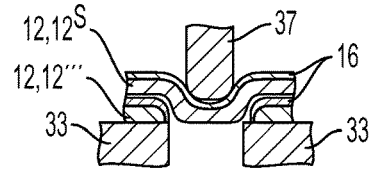
FIG. 7b  FIG. 8b  FIG. 11b
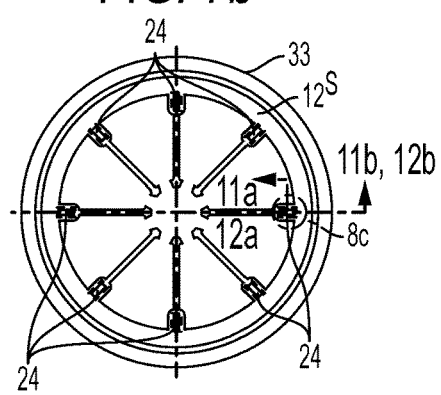
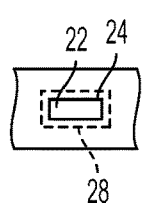
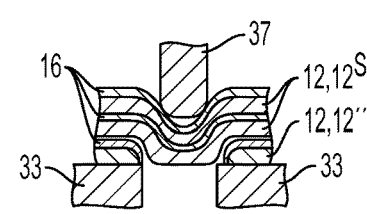
FIG. 7c  FIG. 8c  FIG. 12b

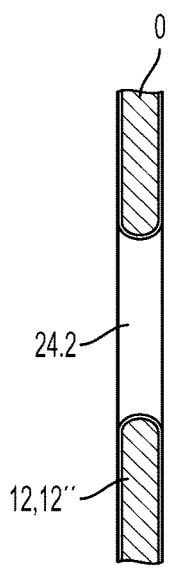
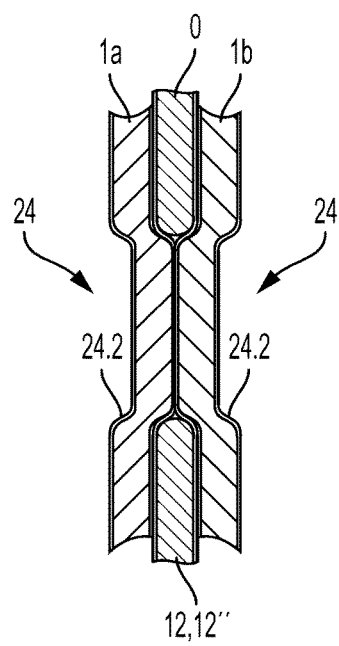
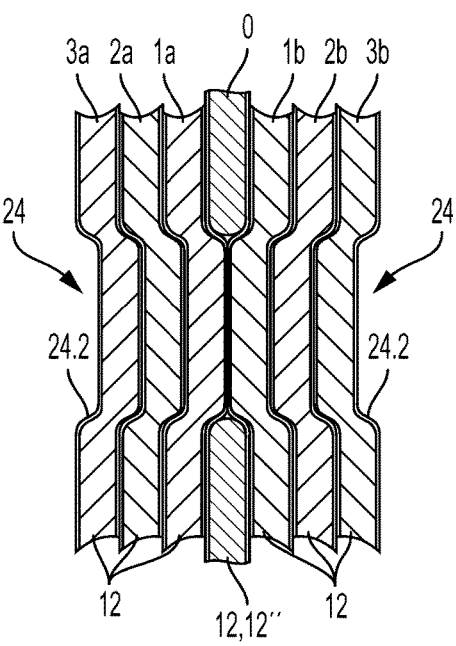
FIG. 16c    FIG. 17    FIG. 18
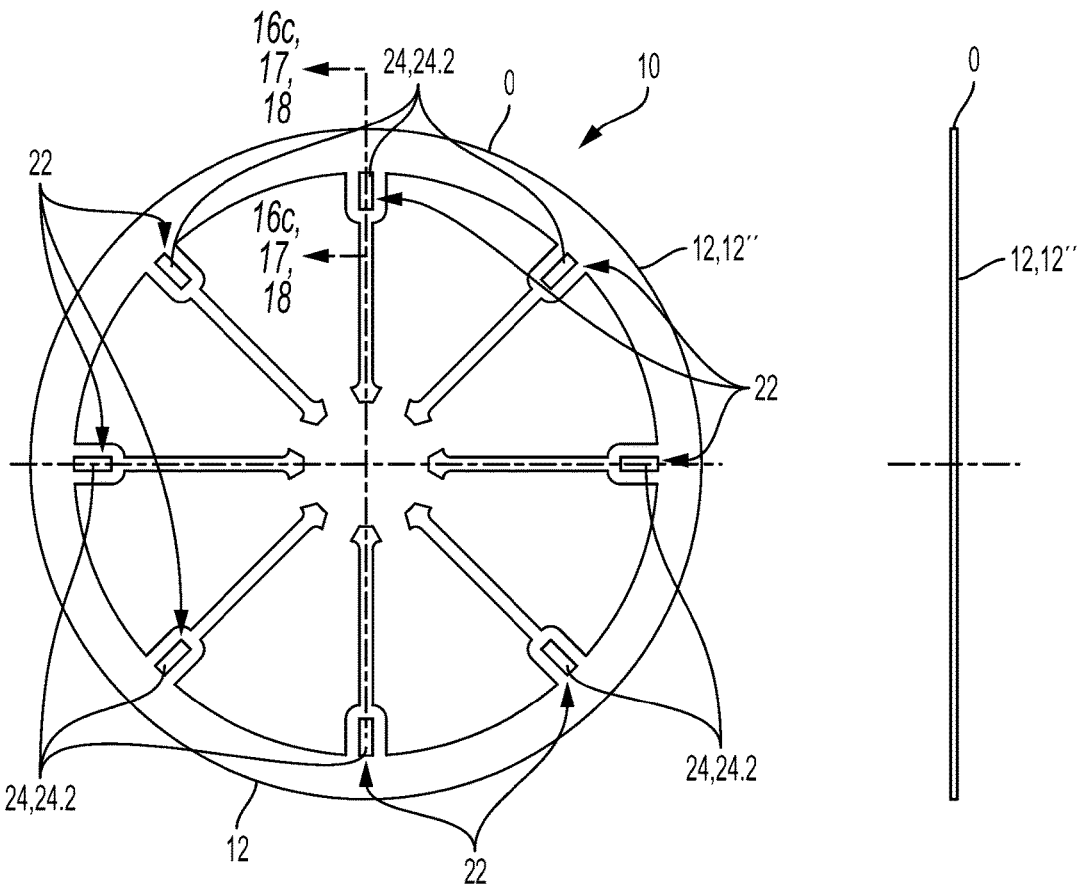
FIG. 16a    FIG. 16b

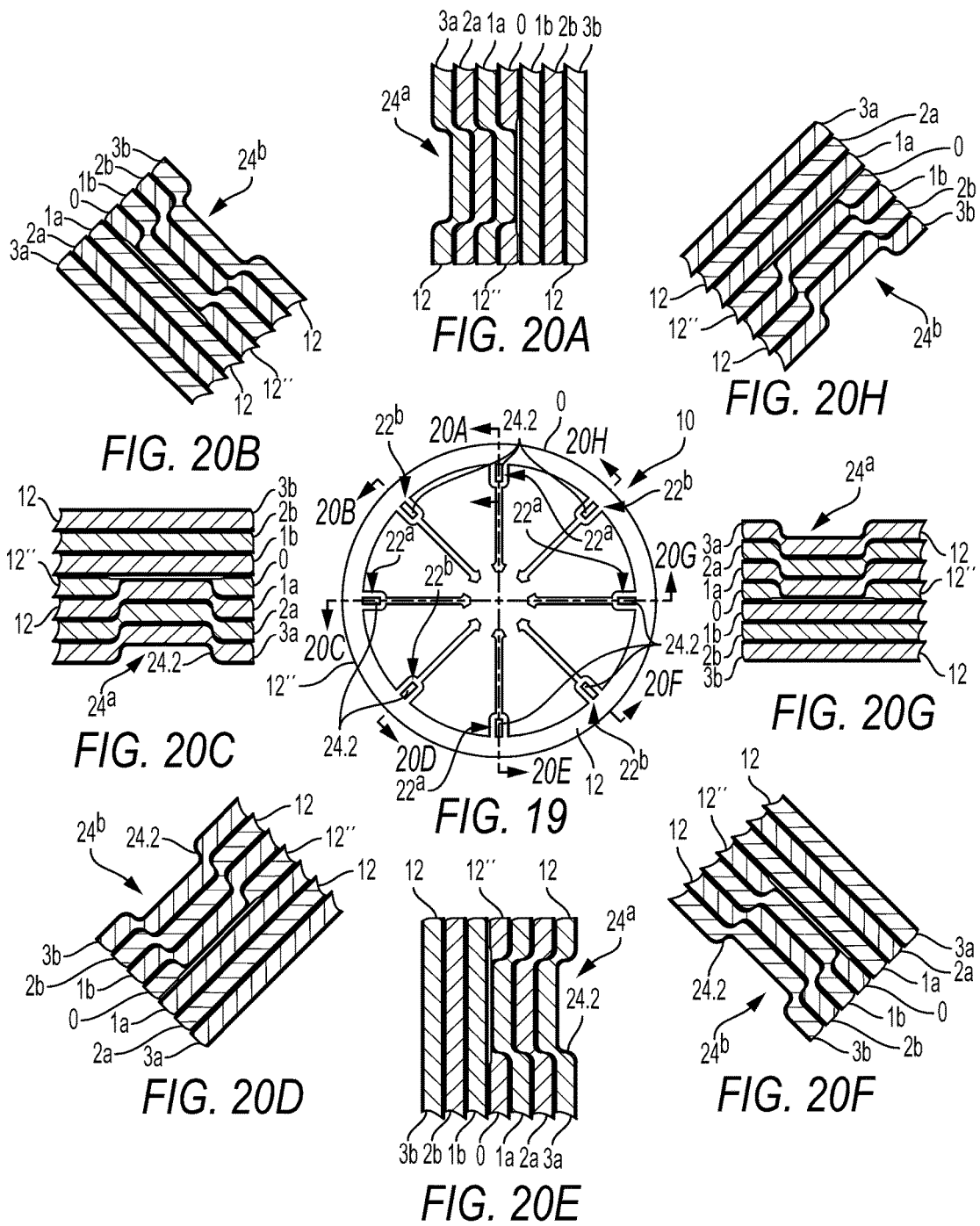

METHOD OF PRODUCING A LAMINATED MAGNETIC CORE

CROSS-REFERENCE TO RELATED APPLICATIONS

The instant application claims the benefit of prior U.S. Provisional Application Ser. No. 62/330,281 filed on 2 May 2016, which is incorporated by reference herein in its entirety.

BRIEF DESCRIPTION OF THE DRAWINGS

In the accompanying drawings:

FIG. 3a illustrates a plan view of a first embodiment of a first aspect of a magnetic core, and a plan view of a corresponding first embodiment of the first aspect of a single lamination of the magnetic core;

FIG. 3b illustrates a side view of the single lamination of the magnetic core illustrated in FIG. 3a;

FIG. 3c illustrates an isometric view of the single lamination illustrated in FIGS. 3a and 3b;

FIG. 3d illustrates a fragmentary radial cross-sectional view of an interlock portion of the single lamination of the first embodiment of the first aspect the magnetic core illustrated in FIGS. 3a-3c;

FIG. 3e illustrates a side view of the magnetic core illustrated in FIG. 3a;

FIG. 4a illustrates a plan view of a second embodiment of the first aspect of a magnetic core, and a plan view of a corresponding second embodiment of the first aspect of a single lamination of the magnetic core;

FIG. 4b illustrates a side view of the single lamination of the magnetic core illustrated in FIG. 4a;

FIG. 4c illustrates an isometric view of the single lamination illustrated in FIGS. 4a and 4b;

FIG. 4d illustrates a fragmentary radial cross-sectional view of an interlock portion of the single lamination of the second embodiment of the first aspect the magnetic core illustrated in FIGS. 4a-4c;

FIG. 4e illustrates a side view of the magnetic core illustrated in FIG. 4a;

FIG. 5a illustrates a plot of magnetic core loss per weight of core material of a single lamination as a function of magnetic flux level, for families of operating frequencies at two different annealing temperatures, for a first lamination thickness;

FIG. 5b illustrates a plot of magnetic core loss per weight of core material of a single lamination as a function of magnetic flux level, for families of operating frequencies at two different annealing temperatures, for a second lamination thickness greater than the first lamination thickness associated with FIG. 5a;

FIG. 5c illustrates a plot of magnetic core loss per weight of core material of a single lamination as a function of magnetic flux level, for families of operating frequencies at two different annealing temperatures, for a third lamination thickness greater than the second lamination thickness associated with FIG. 5b;

FIG. 7a illustrates a plan view of a die cavity with a lamination blank of a third embodiment of the first aspect of a magnetic core therein prior to punching or staking operations;

FIG. 7b illustrates a plan view of the die cavity illustrated in FIG. 7a, with a lamination blank following a punching operation to at least partially punch each of the interlocks of a first lamination;

FIG. 7c illustrates a plan view of the die cavity illustrated in FIGS. 7a and 7b, with a staked lamination following a staking operation to join a next lamination blank to an associated magnetic core of the third embodiment during assembly thereof;

FIG. 8a illustrates a fragmentary plan view of a portion of the lamination blank illustrated in FIG. 7a, which includes an interlock location, prior to punching or staking operations;

FIG. 8b illustrates the fragmentary plan view of a portion of the punched lamination blank illustrated in FIG. 7b, following the punching operation to at least partially punch the associated interlock of the first lamination;

FIG. 8c illustrates the fragmentary plan view of a portion of the punched lamination blank illustrated in FIG. 7c, following the staking operation to join the next lamination blank to an associated magnetic core of the third embodiment at the corresponding interlock location;

FIG. 9 illustrates a fragmentary plan view corresponding to FIG. 8a, further illustrating an outline of a punched portion of the first lamination and the outline of the associated interlock location;

FIG. 10a illustrates a fragmentary first cross-sectional view of a first lamination being at least partially punched against an associated die, at the interlock location illustrated in FIG. 9;

FIG. 10b illustrates a fragmentary second cross-sectional view—orthogonal to the first cross-sectional view illustrated in FIG. 10a—of the first lamination being at least partially punched against the associated die, at the interlock location illustrated in FIG. 9;

FIG. 11a illustrates a fragmentary first cross-sectional view of a second lamination being staked to the first lamination against the associated die, at the interlock location illustrated in FIG. 9;

FIG. 11b illustrates a fragmentary second cross-sectional view—orthogonal to the first cross-sectional view illustrated in FIG. 11a—of the second lamination being staked to the first lamination against the associated die, at the interlock location illustrated in FIG. 9;

FIG. 12a illustrates a fragmentary first cross-sectional view of a third lamination being staked to the second lamination, and to the associated partial assembly of the third embodiment of the magnetic core, against the associated die, at the interlock location illustrated in FIG. 9;

FIG. 12b illustrates a fragmentary second cross-sectional view—orthogonal to the first cross-sectional view illustrated in FIG. 12a—of the third lamination being staked to the second lamination, and to the associated partial assembly of the third embodiment of the magnetic core, at the interlock location illustrated in FIG. 9;

FIG. 13b illustrates a side view of a first lamination of the magnetic core illustrated in FIG. 13a;

FIG. 14 illustrates a fragmentary cross-sectional view of a set of interlocks at an interlock location of the third embodiment of the first aspect of the magnetic core illustrated in FIG. 13a;

FIG. 16a illustrates a plan view of a fourth embodiment of the first aspect of a magnetic core, and a plan view of a corresponding fourth embodiment of the first aspect of a single lamination of the magnetic core;

FIG. 16b illustrates a side view of a first lamination of the magnetic core illustrated in FIG. 16a;

FIG. 16c illustrates a fragmentary cross-sectional view of the first lamination at an interlock location of the magnetic core illustrated in FIG. 16a;

FIG. 17 illustrates a fragmentary cross-sectional view of the first three laminations at the interlock location of the magnetic core illustrated in FIG. 16a;

FIG. 18 illustrates a fragmentary cross-sectional view of the first seven laminations at the interlock location of the magnetic core illustrated in FIG. 16a;

FIG. 19 illustrates a plan view of a fifth embodiment of the first aspect of a first lamination of the magnetic core;

FIGS. 20A through 20H illustrate fragmentary cross-sectional views of the first seven laminations at each of the interlock locations of the magnetic core illustrated in FIG. 19;

FIG. 26b illustrates a side view of the single lamination of the magnetic core illustrated in FIG. 26a;

FIG. 26e illustrates a side view of the magnetic core illustrated in FIG. 26a.

DESCRIPTION OF EMBODIMENT(S)

Figure 1:
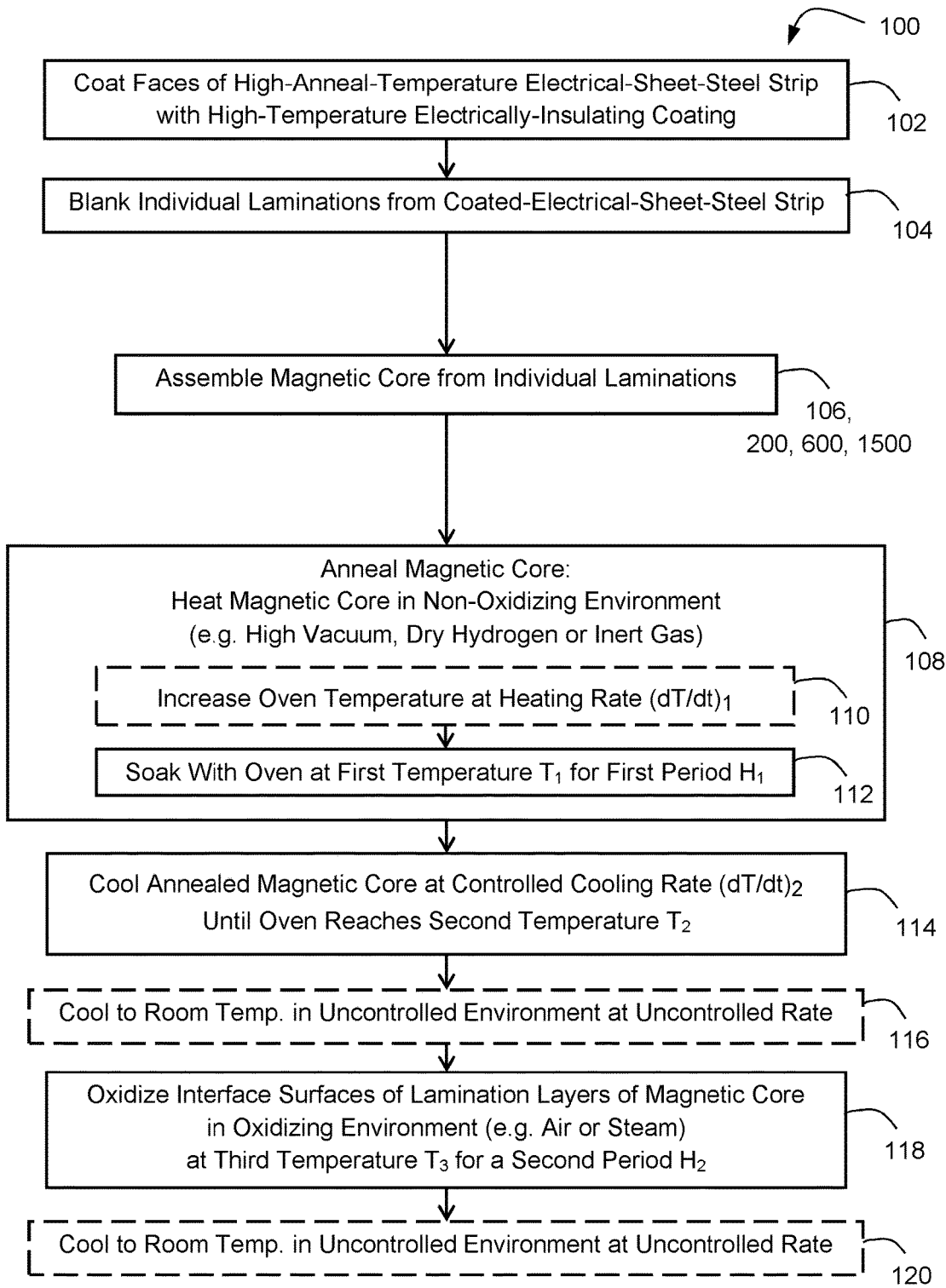
FIG. 1 illustrates a flow chart of a process for producing a laminated magnetic core.

Highly permeable magnetic core materials are available that saturate at relatively high levels of magnetic flux density at a given frequency of operation, but which also require relatively high annealing temperatures to achieve these properties. For example, cobalt-based Hyperco® 50 electrical steel alloy is typically annealed at temperatures of 1,400-1,600 deg F.; and a nickel-based electrical-steel alloy, for example, ALLOY 2, UNSK94840 under ASTM A753, is typically annealed at temperatures as high as 2,300 deg F. Cobalt-based electrical-steel alloys have been found to be well-suited for relatively high power electromagnetic devices, for example, motors or generators. Nickel-based electrical-steel alloys have been found to be well-suited for devices requiring a relatively high output response—for example, either sensor voltage, motor torque or generator current, or generally, either voltage or current alone—in relation to the magnitude of the associated input excitation, for example, for used in sensors or transformers.

Magnetic core losses result from magnetically-induced eddy currents within the core—as a result of the time-varying magnetic flux within the magnetic core—that are opposed by the inherent electrical resistance of the core material, which causes associated $I^2R$ losses therewithin. Generally magnetic core losses can be reduced by constructing the magnetic core from a plurality of laminations that are relatively thin in a direction that is transverse relative to the direction of the magnetic flux, thereby reducing the effective area within which time-varying magnetic flux density can act to generate transversely-directed eddy currents, thereby reducing the associate induced emf, which reduces the magnitude of the associated resulting eddy currents. Magnetic core losses can also be reduced if the associated electrical steel is annealed so that the underlying structure comprises relatively large crystals. Although a magnetic core can be constructed by adhesively bonding pre-annealed laminations of the above-described relatively-high-annealing-temperature electrical steel magnetic core materials, such a process can be relatively more time consuming and relatively more expensive that a competing process that otherwise provides for automatically mechanically joining the laminations together to form the magnetic core. However, a process to automatically mechanically join the laminations together to form the magnetic core—for example, by mechanical staking, which is described more fully hereinbelow—can induce mechanical strains within the associated laminations, which, unless the magnetic core is subsequently annealed following the assembly thereof, can result in relatively higher magnetic core losses therein compared with the core losses if the laminations were fully annealed. However, absent a process for the mitigation thereof, the associated relatively high annealing temperature associated with the relatively-high-annealing-temperature electrical steel can be sufficiently high to cause inter-laminar fusion between adjacent uncoated laminations of a magnetic core during the annealing process—particularly for relatively thin laminations—with a resulting associated degradation of the associated magnetic properties of the magnetic core.

Referring to FIG. 1 in view of FIGS. 3a-3e, 4a-4e, 24 and 26a-26e, there is illustrated a process 100 for producing a laminated magnetic core 10 from a plurality of laminations 12 of relatively-high-annealing-temperature electrical steel 14 that are individually formed and then mechanically assembled to form the magnetic core 10, after which the magnetic core 10 is annealed so as to provide achieving exemplary performance of the underlying relatively-high-annealing-temperature electrical steel 14 material—e.g. so as to provide for relatively high permeability, with associated saturation at relatively high levels of magnetic flux density at a given frequency of operation—without the adverse effect of inter-laminar fusion.

In accordance with one set of embodiments, beginning with step (102), a strip of semi-processed electrical steel having a relatively-high annealing temperature, i.e. relatively-high-annealing-temperature electrical steel 14, is first coated on both faces with an electrically-insulating-coating 16—examples of which include, but are not limited to, magnesium methylate or a zirconium-based compound, for example, HITCOAT® from Vacuumschmelze GmbH & Co. KG ltd. of Germany—that can withstand the associated relatively-high annealing temperature of the underlying relatively-high-annealing-temperature electrical steel 14. Examples of relatively-high-annealing-temperature electrical steels 14 include cobalt-based alloys, for example, cobalt-based alloys per ASTM A810, including Hyperco® 50 having an annealing temperature of 1,400-1,600 deg F.; and nickel-based electrical-steel alloys, for example, ALLOY 2, UNSK94840 under ASTM A753, having an annealing temperatures as high as 2,300 deg F., or other nickel-based electrical-steel alloys covered by ASTM A753. Although the electrically-insulating-coating 16 would typically be coated on both sides of the relatively-high-annealing-temperature electrical steel 14, alternatively, one side of the relatively-high-annealing-temperature electrical steel 14 may be coated, provided that when assembled in the magnetic core 10, adjacent laminations 12' are separated by the electrically-insulating-coating 16 on at least one of the adjacent laminations 12'.

For semi-processed electrical steel strip, the strip is mechanically processed to provide for finished dimensional properties, i.e. final thickness and surface finish, but is not annealed to increase the average crystal size that provides for reducing associated hysteresis loss. As used herein, the terms "relatively-high annealing temperature" and "relatively-high-annealing-temperature" are intended to mean an annealing temperature for which coating-free laminations of the associated electrical steel would tend to fuse to one another when in contact with one another during the associated annealing process.

The associated strip of relatively-high-annealing-temperature electrical steel 14 is at least as wide as minimum lateral dimension (in plan view) of the lamination 12 of the associated magnetic core 10—or the portion thereof for a multi-part lamination—to be blanked from the strip. Generally, the magnitude of associated eddy current losses within a single lamination increases with increasing lamination thickness, which is given by the thickness of the associated sheet of relatively-high-annealing-temperature electrical steel 14. Typically, laminations are constructed with thickness in the range of 1-25 mils, i.e. 25-635 microns. For example, referring to FIGS. 5a-5c, for Hyperco® 50 alloy, eddy current losses within a lamination 12 increase with increasing lamination thickness and increasing operating frequency, but are relatively lower under all conditions when annealed at the relatively higher annealing temperature.

Following step (102)—or initially for another set of embodiments—in step (104), the strip of relatively-high-annealing-temperature electrical steel 14 is blanked to form the individual lamination blanks $12^B$, i.e. so as to shear or cut the individual lamination blanks $12^B$ from the strip of relatively-high-annealing-temperature electrical steel 14, along both the outer 18 and inner 20 profiles of each lamination blank $12^B$, for example, by either punching, laser cutting, or plasma cutting, wherein the punching process, if used, may involve either a single punching operation or a sequence of punching operations (e.g. to punch the outer 18 and inner 20 profiles separately, in either order).

Figure 2:
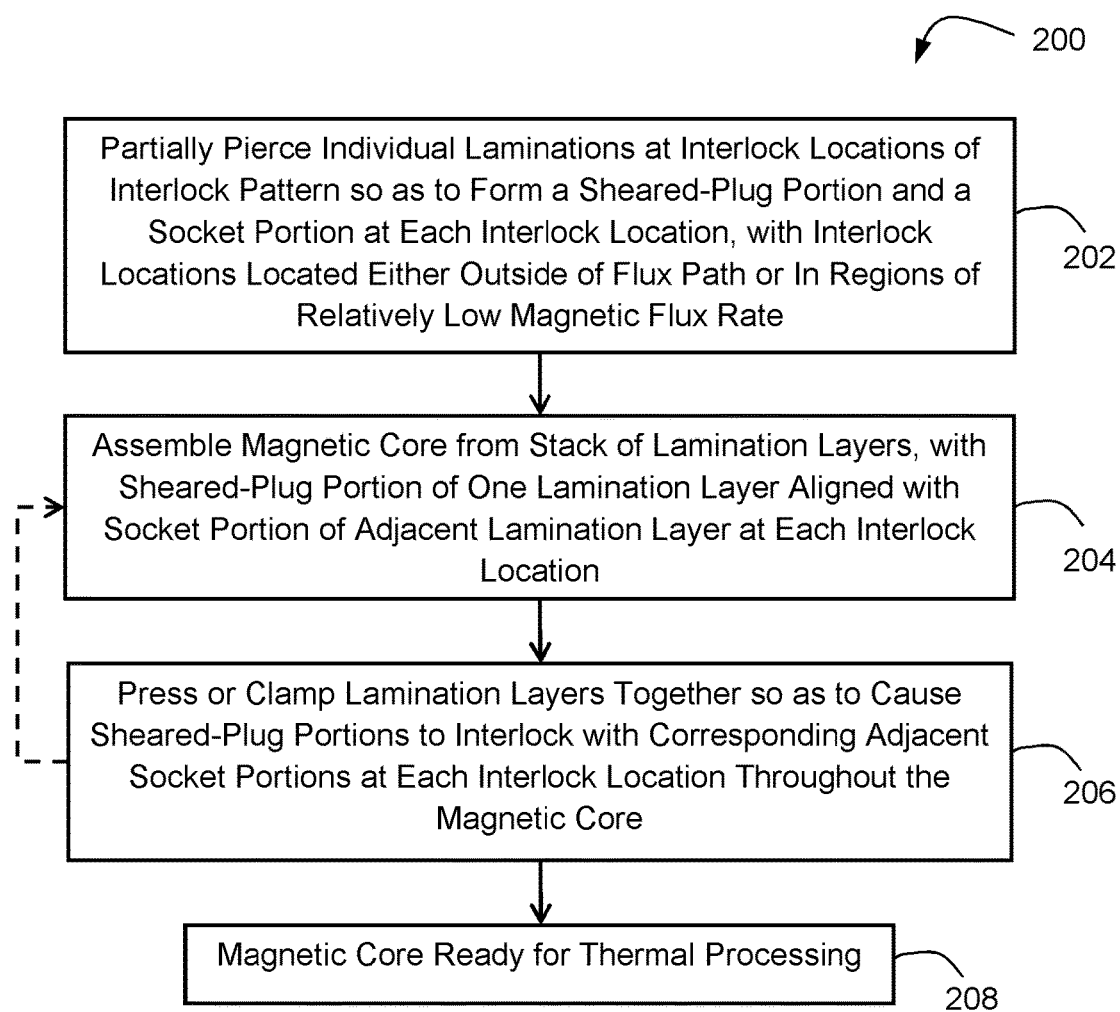
FIG. 2 illustrates a flow chart of a first aspect of a process for assembling a laminated magnetic core from individual laminations.

Then, in step (106), the magnetic core 10 is assembled from a plurality of individual laminations 12. For example, referring to FIG. 2, in accordance with a first aspect of a process 200 for assembling a laminated magnetic core from individual laminations, beginning with step (202), each lamination 12 is partially-pierced at each of a plurality of interlock locations 22, so as to cause a plug portion 24.1 of an associated interlock 24 to be partially sheared from the blanked lamination 12, leaving an associated socket portion 24.2 of the interlock 24 between the first 26.1 and second 26.2 surface planes of the lamination 12 (i.e. planes defining the outside surfaces of the lamination 12), at each interlock location 22, wherein the plug portion 24.1 remains attached to, i.e. a part of, the lamination 12, along the perimeter 28 of the socket portion 24.2 at the base thereof. For example, the depth of the socket portions 24.2 can range from the minimal amount necessary to provide for holding the stack of laminations 12 together—for example, as characterized by a what is known as a pull test—to a maximum amount of 100% of the thickness of the lamination 12, wherein corresponding socket portions 24.2 of each of a plurality of laminations 12 to be assembled to form the magnetic core 10 would each typically be punched to the same depth so as to provide for automatically stacking automatically-manufactured laminations 12 together to form the magnetic core 10. The interlock locations 22 are at regions of the associated magnetic circuit that are either subject to a sufficiently-relatively-low magnetic flux density rate (i.e. dB/dt, dΦ/dt or dλ/dt), or that are located away from regions of maximum flux density so as to not otherwise constrict the magnetic flux within the magnetic core 10 relative to what the magnetic flux would be in a corresponding set of laminations 12 without associated interlocks 24, which provides for a relatively compact magnetic core 10 that can be constructed from relatively-high-performance magnetic core materials using automated manufacturing and assembly techniques.

More particularly, the power loss per unit mass Pin Watts/kg, is given by:

$$P = \frac{\pi^2 \cdot B_p^2 \cdot d^2 \cdot f^2}{6 \cdot k \cdot \rho \cdot D} \tag{1}$$

where $B_p$ is the peak magnetic flux density in Tesla; d is the thickness of the sheet or diameter of the wire, in meters; f is the frequency in Hertz; k is a constant equal to 1 for a thin sheet and 2 for a thin wire; ρ is the resistivity of the material in Ohm-meters, and D is the density of the material in kilograms per cubic meter. With the frequency f being uniform throughout the magnetic core 10, the magnetic flux density rate therewithin is then directly related to the peak magnetic flux density $B_p$, i.e., the peak amplitude of magnetic flux density at the particular location within the magnetic core 10, with the power loss per unit mass P is given by equation (1). Furthermore, whereas the thickness d in equation (1) for the non-interlocked portions of the laminations 12 is given by the lamination thickness $d_L$ (illustrated in FIG. 3a)—in view of the laminations 12 being electrically insulated from one another, —the thickness d in equation (1) for the interlocked portions of the laminations 12, i.e. at the interlock 24, is assumed to be the magnetic core thickness $d_C$ (illustrated in FIG. 3e) in view of the laminations 12 being staked together at these locations, which can provide for eddy currents to flow through the staked junctions across the thickness of the magnetic core 10. In accordance with one aspect, the interlocks 24 are located and designed in cooperation with the laminations 12 so that the power loss per unit mass P within the interlocks 24 is less than the power loss per unit mass P in the remaining portion of the magnetic core 10, for example, either based upon maximum values within the respective regions; bulk average values within the respective regions; or a bulk average or maximum value with in the interlock 24 and localized values with the remaining portion of the magnetic core 10, for example, within a portion of the magnetic core 10 that is immediately adjacent to the interlock 24. Accordingly, for the representative value of peak magnetic flux density $B_p$ within the interlock 24 given by $B_I$, and the representative value of magnetic flux density within the remaining portion of the magnetic core 10 given by $B_C$, in accordance with one set of embodiments, the interlocks 24 are located and designed in cooperation with the laminations 12 so that:

$$B_I \cdot d_C \leq B_C \cdot d_L + \delta \quad (2)$$

so that a representative value of the power loss per unit mass P within the interlock 24 does not exceed a corresponding representative value thereof elsewhere within the magnetic core 10 except by more than a given application-dependent tolerance δ for sub-optimality.

In one set of embodiments, each interlock 24 comprises a rectangular profile 24' having a major axis 30 (i.e. the axis long the relatively longer dimension of the rectangular profile 24') substantially aligned with the direction of magnetic flux in a proximate portion of the lamination 12. For example, in the embodiments illustrated in FIGS. 3a and 4a the major axes 30 are substantially aligned with the corresponding radial axes of the corresponding radially-extending legs 32 of the magnetic core 10 so as to provide for a relatively-larger area in the flux path adjacent thereto than would be possible with a square profile of the same area. The particular shape of the profile is not limiting, and it should be understood that profiles other than a rectangular profile 24' are feasible, for example, circular, elliptical or oval profiles within the rectangular zones illustrated in FIGS. 3a and 4a.

When the laminations 12 are assembled to form the associated magnetic core 10, the socket portion 24.2 of each interlock 24 of each lamination 12 is aligned with a corresponding plug portion 24.1 of a corresponding interlock 24 of an adjacent lamination 12', and when pressed or clamped together, the adjacent plug 24.1 and socket 24.2 portions engage with one another with sufficient interference so as to provide for holding the adjacent laminations 12 together in the associated magnetic core 10. In one set of embodiments, the closest distance from either of the outer 18 and inner 20 profiles of the lamination 12 to the perimeter 28 of the socket portion 24.2 is at least three times the thickness of the lamination 12 so as to provide for engagement—with interference—of the plug 24.1 and socket 24.2 portions of the corresponding interlocks 24 of adjacent laminations 12.

In an alternative embodiment, the interlocks 24 of a first lamination 12″—upon which other laminations 12, 12' are stacked—may be fully pierced so as to comprise only to corresponding socket portions 24.2, i.e. without any corresponding plug portions 24.1, so as to provide for a corresponding first outside surface 10.1 of the magnetic core 10 to be flush with the associated first surface plane 26.1 of the first lamination 12″ thereof.

Referring again to step (102), alternatively, or in addition to the coating operation of step (102), the mating surfaces of the laminations 12 may be coated with the above-described electrically-insulating-coating 16 either after blanking in step (104), or after partial or full piercing in step (202), or both, on one or both sides of the laminations 12.

Referring to step (204), following step (202), the laminations 12 are stacked upon one another as described hereinabove, with each plug portion 24.1 of one lamination 12 aligned with a corresponding socket portion 24.2 of an adjacent lamination 12', for each of the associated plurality of interlocks 24 at each of the interlock locations 22, and for each pair of adjacent laminations 12, 12', 12″.

Then, or repeatedly after subsets of laminations 12 are stacked in step (204), referring to step (206), the plurality of stacked laminations 12 are pressed or clamped together so as to cause each plug portion 24.1 to fully engage with the corresponding associated adjacent socket portion 24.2 for each interlock 24 within the magnetic core 10—or portion thereof if pressing or clamping less than all of the laminations 12 together—thereby causing the laminations 12 to mechanically engage with one another. Following the assembly of all the laminations 12 in steps (204) and (206) to form the entire magnetic core 10, in step (208) the assembled magnetic core 10 is ready for thermal processing, thereby completing step (106).

Returning to FIG. 1, following step (106), in step (108), the assembled magnetic core 10 is annealed in a non-oxidizing environment within an oven at a specified material-dependent annealing temperature for a given period of time so as to provide for development within each of the laminations 12 of a grain structure having a relatively large average crystal size. Examples of a non-oxidizing environment include a high vacuum—for example, typically about 1 millitorr, but generally as close to 0 Torr as possible, —a dry hydrogen environment having a dew point at or below −40 deg F., or a similarly-dry inert gas environment, for example, argon.

TABLE 1

Figure 24:
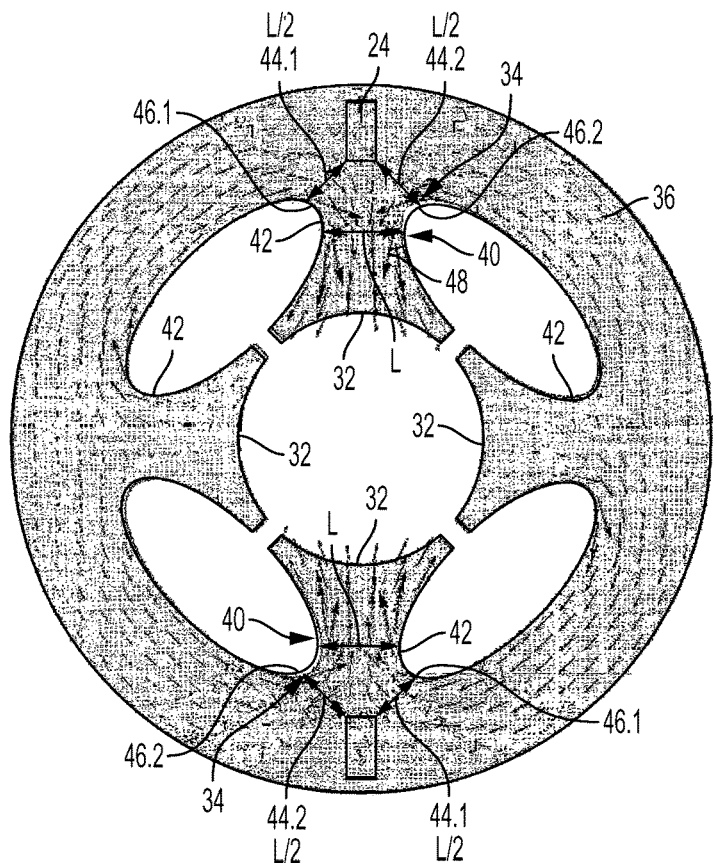
FIG. 24 illustrates a plan view of a seventh embodiment of the first aspect of a magnetic core, wherein the interlocks are located so as to not more than insubstantially inhibit a magnetic flux therein, as illustrated by the associated simulated magnetic flux vectors.

| Embodiment: | FIGS. 3, 4, 26 | FIG. 24 |
|---|---|---|
| Material: | Cobalt-based (per ASTM A810) | Nickel-based |

| Annealing Process w/ Non-Oxidizing Environment | | | | | |
|---|---|---|---|---|---|
| Step | Description | deg F., deg F./hr | Hours | deg F., deg F./hr | Hours |
| 108/110 | Heating Rate $(dT/dt)_1$ | 600-1200 | | 600-1200 | |
| 108/112 | Heat @ $T_1$ for $H_1$ hours | 1550 +/− 25 | 2-4 | 2150 +/− 50 | 4 |
| 114 | Cooling Rate $(dT/dt)_2$ | −150 +/− 50 | | −150 +/− 50 | |
| 114 | Cool to $T_2$ | 600 +/− 50 | | 800 +/− 50 | |

| Oxidization Process w/ Oxidizing Environment | | | | | |
|---|---|---|---|---|---|
| Step | Description | deg F. | Hours | deg F. | Hours |
| 118 | Heat @ $T_3$ for $H_2$ hours | 900 +/− 50 | 1.5-2 | 900 +/− 50 | 1.5-2 |

Within step (108), with the magnetic core 10 in a non-oxidizing environment within the oven, in step (110), the temperature of the oven is increased, for example at a first rate $(dT/dt)_1$ indicated in Table 1. Then, in step (112), after reaching the material-dependent first temperature $T_1$ indicated in Table 1, the temperature of the oven is maintained within tolerance at this first temperature $T_1$ and the magnetic core 10 is exposed therein for a material- and to mass-dependent first time period $H_1$ as indicated in Table 1, so as to provide for annealing the magnetic core 10 in order to increase the average crystal size of the metal grains constituting the laminations 12 thereof. Thereafter, in step (114), with the non-oxidizing environment maintained, the oven is cooled at a second rate $(dT/dt)_2$ (deg F./hr) indicated in Table 1 so as to gradually cool the magnetic core 10 and thereby maintain the relatively large average crystal size that had been achieved during the annealing process of step (112). The oven is cooled at the second rate $(dT/dt)_2$ (deg F./hr) until reaching a material-dependent second temperature $T_2$, after which, in step (116), the oven may be further cooled to room temperature at an uncontrolled rate, and with the environment therein uncontrolled, resulting in a fully-annealed magnetic core 10.

Following the annealing and associated cooling processes of steps (108) and (114), in step (118), the magnetic core 10 is subsequently heated within an oxidizing environment in an oven at a third temperature $T_3$ for a material- and surface-area-dependent second time period $H_2$ as indicated in Table 1, so as to provide for developing one or more oxide layers on the abutting surfaces of the laminations 12 of the magnetic core 10, which provides for increasing the electrical resistance between adjacent laminations 12 and thereby inhibits a tendency for eddy currents to flow between adjacent laminations 12 during operation of the magnetic core 10. Examples of an oxidizing environment include air or steam, or in a chemical environment as necessary to cause bluing. Following step (118), in step (120), the oven is cooled to room temperature at an uncontrolled rate, with the magnetic core 10 in an uncontrolled environment.

Figure 6:
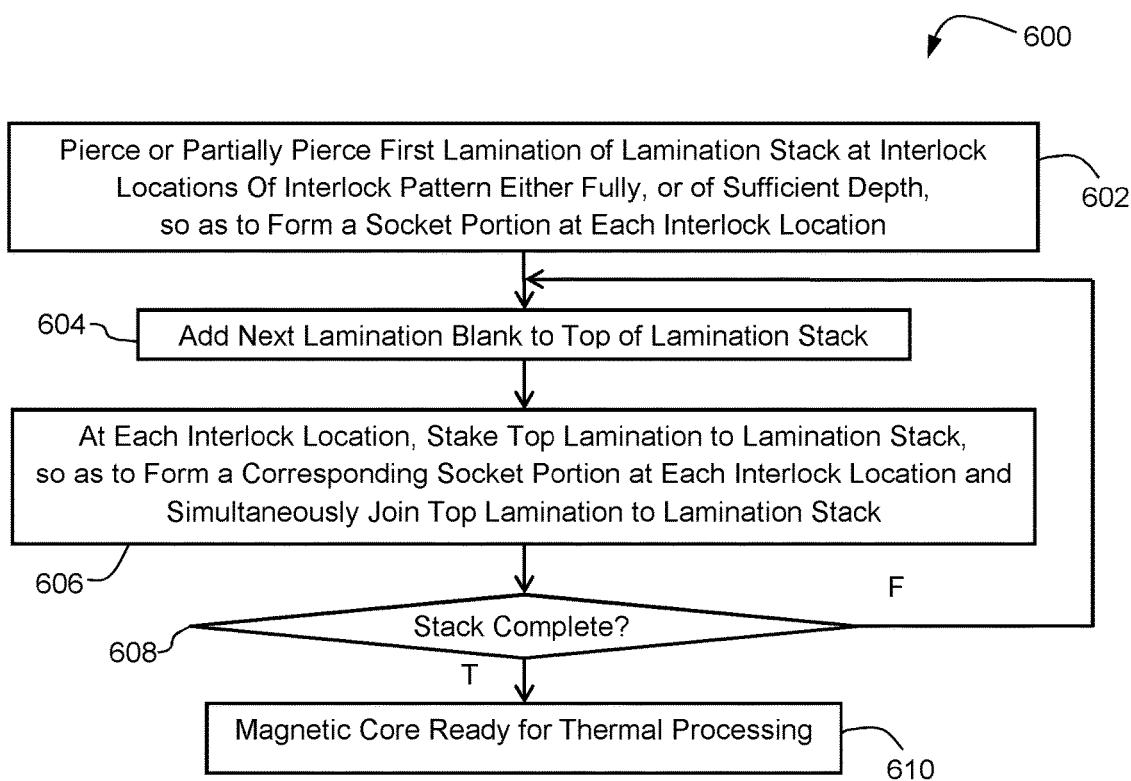
FIG. 6 illustrates a flow chart of a second aspect of a process for assembling a laminated magnetic core from individual laminations.

Referring to FIG. 6, in accordance with a second aspect, an assembly process 600 for assembling a laminated magnetic core 10 from a plurality of laminations 12 of relatively-high-annealing-temperature electrical steel 14 provides for assembling the magnetic core 10 from a plurality of lamination blanks $12^B$, the first lamination blank $12^B$, 12" of which is punched at the interlock locations 22 to form the associated socket portions 24.2 therein so as provide for the first lamination 12" of the magnetic core 10, the remaining lamination blanks $12^B$ of which are successively automatically placed over the magnetic core 10 and staked thereto, one lamination 12 at a time.

For example, FIGS. 7a-7c, 8a-8c, 9, 10a-10b, 11a-11b and 12a-12b illustrate the operation of assembling a third embodiment of the first aspect of a magnetic core 10 in accordance with the second aspect of the associated assembly process 600. More particularly, following step (104) of the process 100 illustrated in FIG. 1 for producing a laminated magnetic core, in step (106), the magnetic core 10 is assembled from a plurality of individual laminations 12 in accordance with the second aspect of the associated assembly process 600 illustrated in FIG. 6. For example, beginning with step (602), with reference to FIGS. 7a, 8a and 9, a first lamination blank $12^B$, 12" is automatically loaded into a die cavity 33 and aligned therein with so that the corresponding associated interlock locations 22 are aligned with the corresponding punches 35, 37 that are respectively used to punch the socket portions 24.2 of each interlock 24 in the first lamination 12", and to subsequently stake the subsequent laminations 12 to the first 12" and subsequent 12 laminations so as to form the magnetic core 10. Then, referring to FIGS. 7b, 8b, 10a and 10b, the first lamination blank $12^B$, 12" is punched—either fully or partially—at each of the plurality of interlock locations 22 so as to generate an associated socket portion 24.2 of the interlock 24 at each interlock location 22 of the first lamination 12". Even if partially punched, —resulting in corresponding associated plug portions 24.1 extending from the opposite side of the first lamination 12" (i.e. from an outer side of the magnetic core 10)—the socket portion 24.2 of the interlock 24 would be deep enough to provide for a subsequent stake from a second lamination 12 thereinto to be sufficiently strong to secure the second laminations 12 thereto. For example, the punches 35 used to form the socket portions 24.2 of the interlocks 24 of the first lamination 12" would typically have relatively sharp edges.

Then, in step (604)—also illustrated by FIGS. 7a and 8a—a second lamination 12 is automatically placed over the punched first lamination 12" and aligned therewith in the die cavity 33, as had been the first lamination blank $12^B$, 12".

Then, in step (606), referring to FIGS. 7c, 8c, 11a and 11b, the second lamination 12 is automatically staked to the first lamination 12" at each of the interlock locations 22, so as to cause plastic deformation of the first 12" and second 12 laminations proximate to the associated interlocks 24, which provides for mechanically joining the first 12" and second 12 laminations. For example, in one set of embodiments, the punches 37 used in the staking operation are blunt edged, and, for example, of smaller cross-sectional dimensions than the corresponding punches 35 used to form the socket portions 24.2 in the first lamination 12".

Then, in step (608), if the stack of laminations 12 of the magnetic core 10 is not complete, then the processes of steps (604) and (606) repeat beginning with step (604). For example, in step (604)—also illustrated by FIGS. 7a and 8a—a third lamination 12 is automatically placed over the staked lamination blank $12^S$ of the second lamination 12 and aligned therewith in the die cavity 33, as had been the first $12^B$, 12" and second $12^B$ lamination blanks.

Then, in step (606), referring to FIGS. 7c, 8c, 12a and 12b, the third lamination 12 is automatically staked to the second lamination 12 at each of the interlock locations 22, so as to cause plastic deformation of the second and third laminations 12 proximate to the associated interlocks 24, which provides for mechanically joining the second and third laminations 12.

Figure 14:
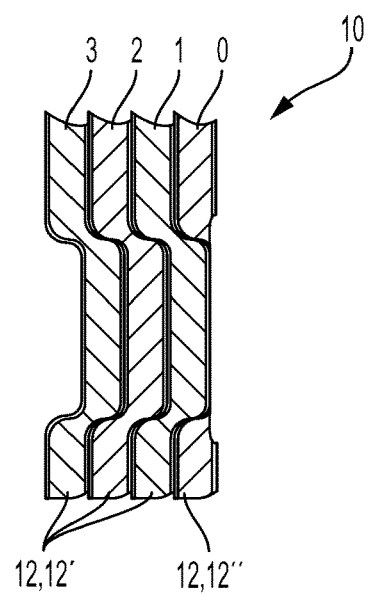
Figure 13A:
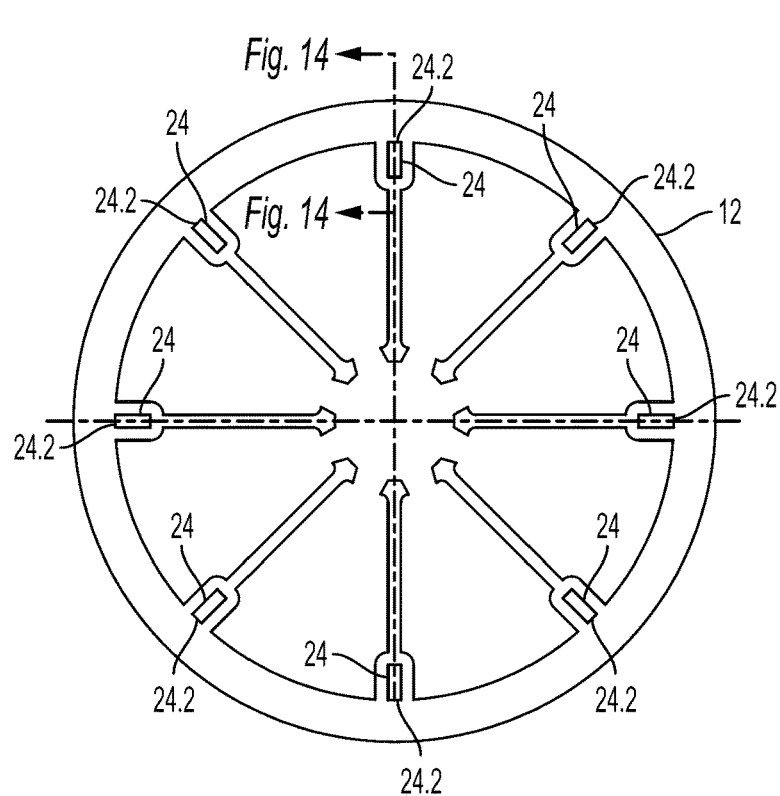
FIG. 13a illustrates a plan view of the third embodiment of the first aspect of the magnetic core, and a plan view of a corresponding third embodiment of the first aspect of a single lamination of the magnetic core.
Figure 13B:
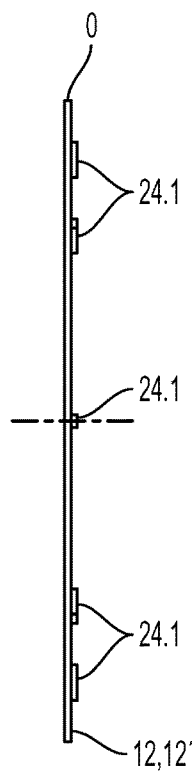

Referring to FIG. 13a, the interlocks 24 of the first lamination 12" of the third embodiment of the first aspect of the magnetic core 10 are either fully punched, or partially punched as illustrated in FIG. 13b, the same as illustrated in FIGS. 3a and 3b, corresponding to FIGS. 7b, 8b, 10a and 10b. Referring to FIG. 14, the second lamination 12, 12' (designated as "1") is first staked to the first lamination 12, 12" (designated as "0") at each interlock 24. Then, the third lamination 12, 12' (designated as "2") is staked to the second lamination 12, 12' ("1") at each interlock 24, after which the fourth lamination 12, 12' (designated as "3") is staked to the third lamination 12, 12' ("2") at each interlock 24, and so on, until the entire magnetic core 10 is assembled. In FIG. 14, the first lamination 12, 12" ("0") is illustrated with the plug portions 24.1 of the associated interlocks 24 removed, either prior to assembly by fully punching the interlocks 24, or following assembly of the magnetic core 10.

Figure 15:
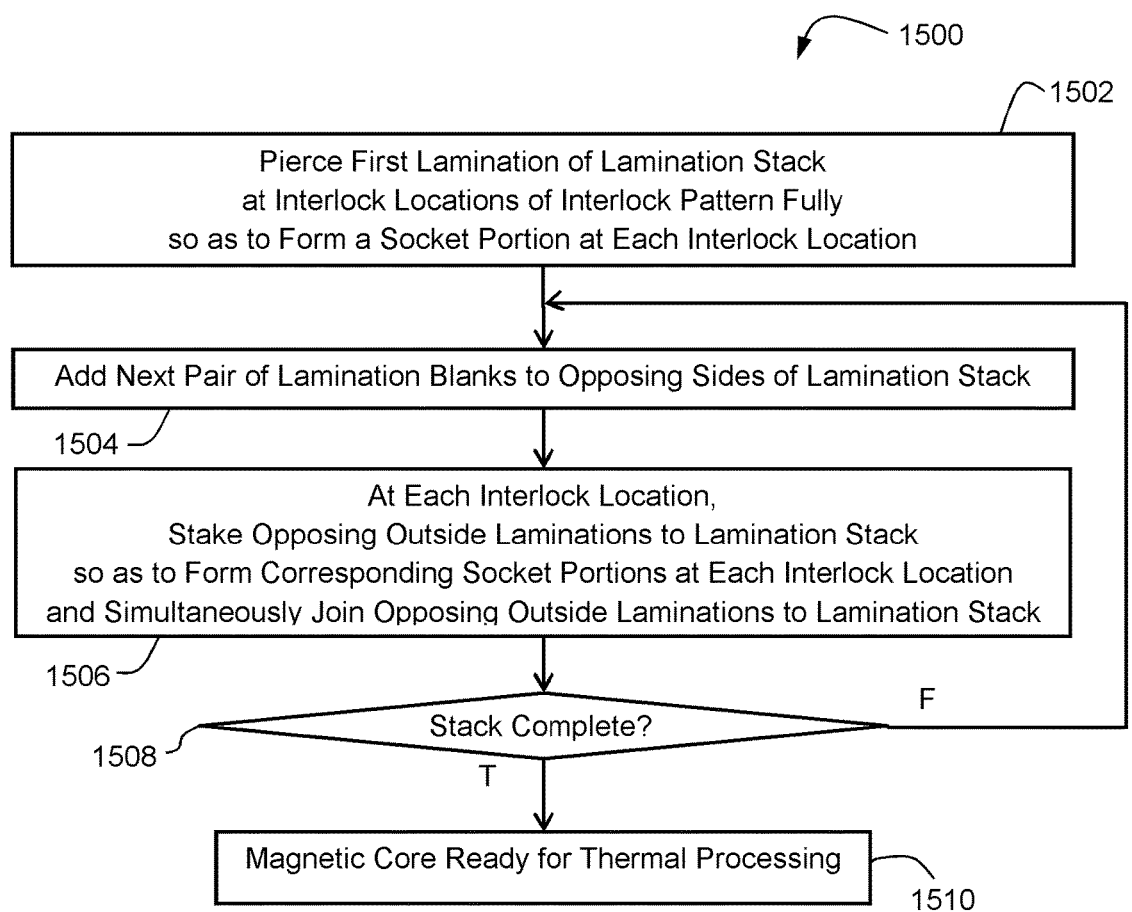
FIG. 15 illustrates a flow chart of a third aspect of a process for assembling a laminated magnetic core from individual laminations.
Figure 22B:
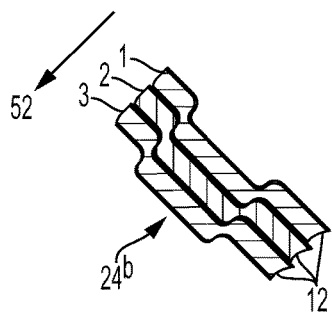
FIGS. 22A through 22H illustrate fragmentary cross-sectional views of the first three laminations at each of the interlock locations of the magnetic core illustrated in FIG. 21.
Figure 22A:
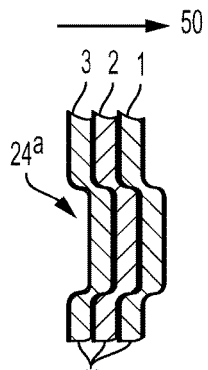
Figure 22H:
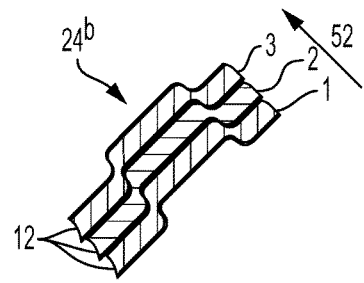
Figure 22C:
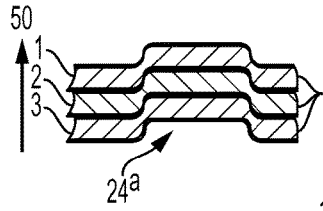
Figure 21:
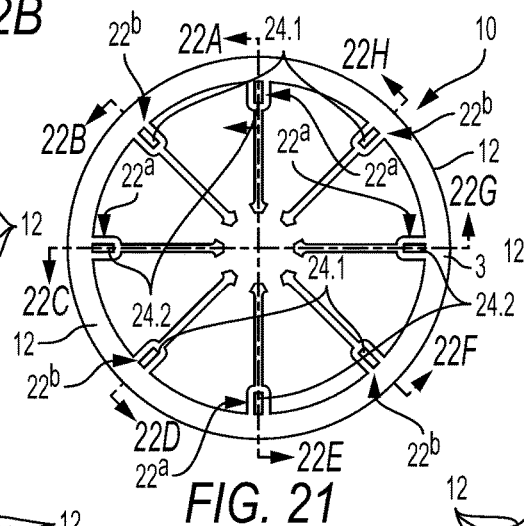
FIG. 21 illustrates a plan view of a sixth embodiment of the first aspect of a magnetic core, and a plan view of a corresponding sixth embodiment of the first aspect of a single lamination of the magnetic core.
Figure 22G:
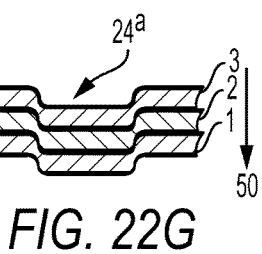
Figure 22D:
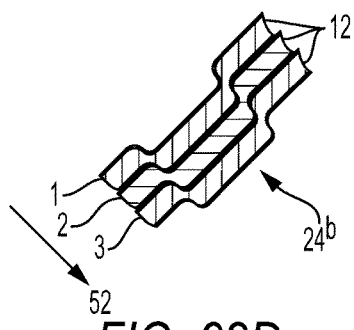
Figure 22E:
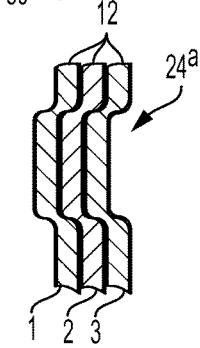
Figure 22F:
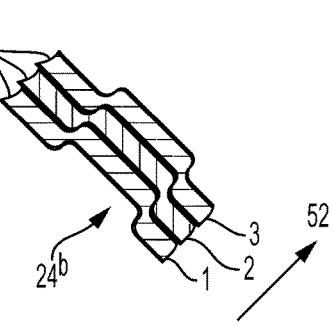

Referring to FIG. 15, a third aspect of a process 1500 for assembling a laminated magnetic core 10 from a plurality of laminations 12 of relatively-high-annealing-temperature electrical steel 14 provides for assembling the magnetic core 10 from a plurality of lamination blanks $12^B$, the first lamination blank $12^B$, 12" of which is fully punched at the interlock locations 22 to form the associated socket portions 24.2 therein and thereby provide for the first lamination 12" of the magnetic core 10, the remaining lamination blanks $12^B$ of which are successively automatically placed over the magnetic core 10 on both sides of the laminated magnetic core 10 and staked thereto, either simultaneously, one pair of laminations 12 at a time on opposing sides of the laminated magnetic core 10, or sequentially, one lamination 12 at a time.

For example, referring also to FIGS. 16a-c illustrating a fourth embodiment of the first aspect of a magnetic core 10, beginning with step (1502), a first lamination blank $12^B$, 12" is automatically loaded into a die cavity 33 (similar to that illustrated in FIGS. 7a-7c) and aligned therein with so that the corresponding associated interlock locations 22 are aligned with the corresponding punches 35, 37 (similar to that illustrated in FIGS. 7a-7c, but with staking punches 37 operative on both sides of the magnetic core 10) that are respectively used to punch the socket portions 24.2 of each interlock 24 in the first lamination 12", and to subsequently stake the subsequent laminations 12 to the first 12" and subsequent 12 laminations so as to form the magnetic core 10. Then, the first lamination blank $12^B$, 12" is fully punched with relatively-sharp-edged punches 35 at each of the plurality of interlock locations 22 so as to generate an associated socket portion 24.2 of the interlock 24 at each interlock location 22 of the first lamination 12".

Then, referring to FIG. 17, in step (1504), a pair of second ("1a") and third ("1b") laminations 12 are automatically placed over corresponding opposing sides of the punched first lamination 12" and aligned therewith in the die cavity 33.

Then, in step (1506), the second ("1a") and third ("1b") laminations 12 are automatically staked to the first lamination 12" from opposing sides thereof at each of the interlock locations 22—each stake having a depth of up to half the thickness of the lamination 12—so as to cause plastic deformation of the first 12" ("0") and second 12 ("1a") laminations proximate to the associated interlocks 24, and so as to cause plastic deformation of the first 12" ("0") and third ("1b") 12 laminations proximate to the associated interlocks 24, which provides for mechanically joining the first 12" ("0"), second 12 ("1a"), and third 12 ("1b") laminations. For example, in one set of embodiments, the punches 37 used in the staking operation are blunt edged, and, for example, of smaller cross-sectional dimensions than the corresponding punches 35 used to form the socket portion 24.2 in the first lamination 12".

Then, in step (1508), if the stack of laminations 12 of the magnetic core 10 is not complete, then the processes of steps (1504) and (1506) repeat beginning with step (1504). For example, referring to FIG. 18, in step (1504), an additional pair of laminations ("2a", "2b") 12 is automatically placed over opposing sides of the previously staked magnetic core 10 and aligned therewith in the die cavity 33, after which, in step (1506), this additional pair of to laminations ("2a", "2b") 12 is automatically staked to the magnetic core 10 from opposing sides thereof at each of the interlock locations 22, so as to cause plastic deformation of this additional pair of laminations ("2a", "2b") 12 proximate to the associated interlocks 24 on opposing sides of the magnetic core 10, which provides for mechanically joining this additional pair of laminations ("2a", "2b") 12 to the magnetic core 10. The processes of steps (1504) and (1506) continue to repeat with step (1504) until the magnetic core 10 is fully assembled. For example, FIG. 18 illustrates the magnetic core 10 with yet a further additional pair of laminations ("3a", "3b") 12 staked thereto. Following the assembly of all the laminations 12 in steps (1506) and (1508) to form the entire magnetic core 10, in step (1510) the assembled magnetic core 10 is ready for thermal processing, thereby completing step (106).

The first lamination 12" ("0") need not necessarily be at the center of the magnetic core 10, but this provides for simultaneously adding and staking additional laminations 12 from opposing sides of the magnetic core 10, and thereby most quickly complete the assembly of the magnetic core 10.

Referring to FIGS. 19 and 20A-20H, in accordance with a fifth embodiment of the first aspect of a magnetic core—which is also assembled in accordance with the third aspect of the process 1500 for assembling a laminated magnetic core 10 from a plurality of laminations 12 of relatively-high-annealing-temperature electrical steel 14 illustrated in FIG. 15—alternatively, the laminations 12 can be staked to the first 12" and subsequent 12, 12' laminations to the full depth of the lamination 12, while also providing for simultaneously adding and staking pairs of laminations 12, ("_a", "_b") to opposing sides of the magnetic core 10, by staking first alternate interlock locations 22, $22^a$ from a first side $10^a$ of the magnetic core 10, and by staking the remaining second alternate interlock locations 22, $22^b$ from the opposing second side $10^b$ of the magnetic core 10, with the first $22^a$ and second $22^b$ alternate interlock locations interleaved with respect to one another. For example, FIGS. 20A through 20H illustrate rotationally-invariant cross-sectional views of the interlocks 24, $24^a$, $24^b$ at each corresponding interlock location 22, $22^a$, $22^b$ for seven interlocked laminations 12 ("3a", "2a", "1a", "0", "1b", "2b", "3b"). Accordingly, at each interlock location 22, $22^a$, $22^b$, portions of the laminations 12 on one side of the first lamination 12" are perturbed by staking, and corresponding portions of the laminations 12 on the corresponding opposing side of the first lamination 12" are not perturbed by staking, wherein the side perturbed by staking alternates with alternating interlock location 22, $22^a$, $22^b$, so as to collectively provide for a circumferential magnetic circuit for which half of the laminations 12 are unperturbed by staking. For a given lamination 12, alternate interlock locations 22, $22^a$, $22^b$ are staked to the full depth of the lamination 12, which provides for substantially the same stake contact area as the fourth embodiment for which each interlock location 22 is staked to half the depth of the lamination 12, wherein both the fourth and fifth embodiments provide for pairs of laminations 12 to be simultaneously assembled to opposing sides of the magnetic core 10, with similar reductions in associated assembly time as a result thereof.

Alternatively, the fourth embodiment of the first aspect of a magnetic core 10 could be modified by either increasing the thickness of the first lamination 12" to be thicker than the remaining laminations 12—for example, at least twice the thickness thereof,—or to use a pair of first laminations 12" that are each fully pierced, but staked to one another at locations other than the above-described interlock locations 22—for example, along the outer 18 and/or inner 20 profiles, or therebetween, for example, along the outer ring structure 36—so as to provide for the remaining laminations 12 to each be staked to a relatively-greater depth—for example, the full depths thereof,—and thereby provide for a relatively higher stake contact areas than provided by the previously-described fourth and fifth embodiments, while also providing for pairs of laminations 12 to be simultaneously assembled to opposing sides of the magnetic core 10, with similar reductions in associated assembly time as a result thereof.

Referring to FIGS. 21 and 22A through 22H, in accordance with a sixth embodiment of the first aspect of a magnetic core 10, the interlocks 24, 24$^a$ at first alternate interlock locations 22, 22$^a$ are partially pierced or staked in a first axial direction 50, and the interlocks 24, 24$^b$ at the remaining second alternate interlock locations 22, 22$^b$ are partially pierced or staked in an opposing second axial direction 52, so that each lamination 12 in the interior of the assembled magnetic core 10 is staked to both associated adjacent laminations 12'. The sixth embodiment of the first aspect could be assembled in accordance with any of the above-described first 200, second 600 or third 1500 aspects of the process for assembling the magnetic core 10, possibly involving a combination of moving punches and dies respectively associated with corresponding respective socket 24.2 and plug 24.1 portions of the corresponding interlocks 24. For example, FIGS. 22A through 22H illustrate rotationally-invariant cross-sectional views of the interlocks 24, 24$^a$, 24$^b$ at each corresponding interlock location 22, 22$^a$, 22$^b$ for three interlocked laminations 12 ("1", "2", "3").

The interlocks 24—also referred to as "stakes"—provide for automatically producing the laminations 12 and provide for automatically assembling the magnetic core 10 therefrom by "staking" the laminations together by action of interference fits between the corresponding plug 24.1 and socket 24.2 portions of each interlock 24 on each lamination 12 of the plurality of laminations 12 constituting the magnetic core 10. Although the electrically-insulating-coating 16 on each of the mating surfaces of the adjacent, abutting laminations 12 acts to prevent the adjacent, abutting laminations 12 from fusing to one another where the electrically-insulating-coating 16 is present, the electrically-insulating-coating 16 can be scraped off the sheared edges of the plug 24.1 and socket 24.2 portions of each interlock 24 so as to provide for these bared edges to become locally fused to one another during the annealing process as a result of the associated relatively high annealing temperature. Accordingly, the interlock locations 22 can become otherwise susceptible to causing eddy current losses following the thermal conditioning processes of steps (108) through (120) of the process 100 illustrated in FIG. 1 for producing a laminated magnetic core 10, however, this prospective susceptibility is mitigated by locating the interlocks 24 in regions that experience relatively-low magnetic flux density rate during operation of the magnetic core 10. Furthermore, the oxidation process of step (118) after the magnetic core 10 is annealed provides for increasing the resistance between each of the adjacent abutting laminations 24, so as to further reduce the susceptibility to eddy current losses within the magnetic core 10 during operation thereof.

In accordance with the first aspect, the magnetic core 10 and the associated laminations 24 thereof are subject to a time-varying magnetic flux (i.e. dB/dt, dΦ/dt or dλ/dt) during the operation thereof. Accordingly, for one set of embodiments, the interlock locations 22 and associated interlocks 24 are designed so that the presence of the interlocks 24 does not substantially change the locations of maximum flux density within the magnetic core 10 relative to the corresponding locations with the same set of laminations 12 but without the interlocks 24.

Figure 23:
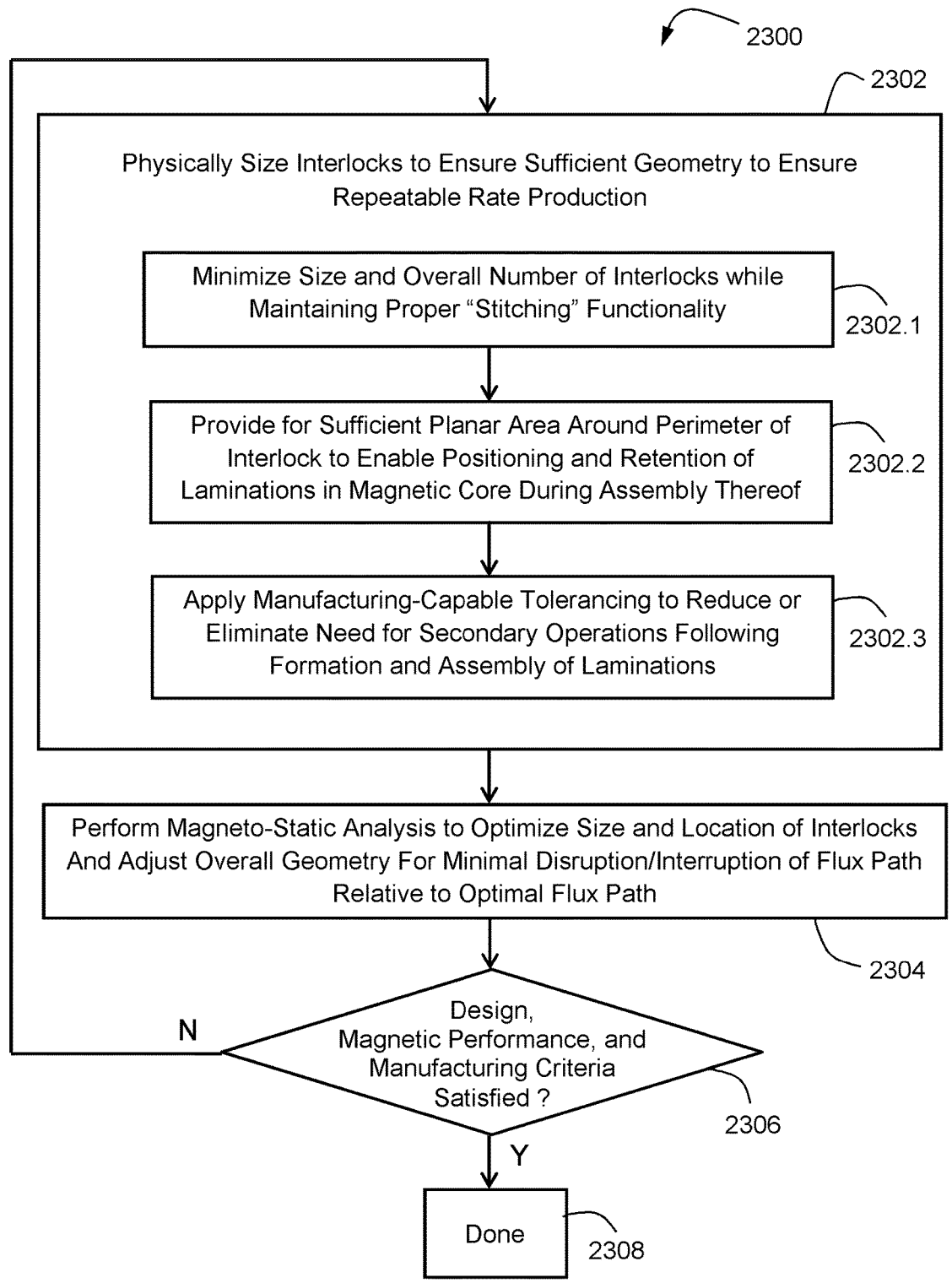
FIG. 23 illustrates a flow chart of a process for designing interlocks and associated interlock locations of the associated laminations of the magnetic core.

For example, referring to FIG. 23, in one set of embodiments, the interlocks 24 and associated interlock locations 22 for the laminations 12 of the magnetic core 10 are designed in accordance with an interlock design process 1100 that begins in step (2302) by physically sizing the interlocks 24, i.e. the associates stakes, so as to ensure sufficient geometry so that the laminations 12 and the associated magnetic cores 10 can be repeatably automatically produced at a given production rate—e.g. when mass produced, —which, for example, includes sub-steps (2302.1), (2302.2) and (2302.3) as follows: In step (2302.1), the size of each interlock 24 and the overall number of interlocks 24 is minimized while retaining sufficient plan area of each interlock 24 so as to ensure proper 'staking" functionality, i.e. so that the face-to-face contact to between adjacent laminations 24 is maintained throughout the entire magnetic core 10 as a result of the cohesive action of the plug 24.1 and socket 24.2 portions in engagement with one another. In step (2302.2), the interlocks 24 and interlock locations 22 are designed so that each interlock 24 is surrounded by sufficient material of the lamination 12—for example, three times material thickness—around the entire periphery of the socket portion 24.2 of the interlock 24 so as to enable each pair of laminations 12 to be consistently positioned relative to one another, and retained to one another, during assembly of the magnetic core 10, throughout the magnetic core 10. More particularly, the interlocks 24 provide for both axially holding the laminations 12 of the magnetic core 10 together, and also provide for positioning the laminations 12 with respect to one another both radially and tangentially. Having sufficient material of the lamination 12 surrounding each interlock 24 provides for both a sufficient force to hold the laminations 12 together, and also provides for assuring that the plug 24.1 portions of the interlock 24 remains substantially aligned with the nominal location of the corresponding socket portion 24.2 of the interlock 24 during and after assembly of the adjacent laminations 12, so as to maintain the correct positioning of the adjacent laminations 12 during and after assembly. Accordingly, the design of the interlocks 24 and the associated material of the laminations 12 surrounding the interlock locations 22 is intended to prevent the following deficiencies: 1) skewing of adjacent laminations 12 off axis in excess of performance requirements; 2) erratic axially spacing resulting in excessive gap between laminations and/or total length variations in excess of performance requirements; 3) a spiraling of the laminations 12 along the axis of the magnetic core 10—resulting in helical, rather than axial, "teeth"—in excess of performance requirements; and 4) inability to maintain required holding force of the interlocks 24. In step (2302.3), manufacturing-capable tolerancing is applied to either reduce or eliminate the need for secondary manufacturing operations following either the formation of the individual laminations 12, or the assembly of pluralities thereof to form the associated magnetic cores 10.

Then, following step (2302), in step (2304), a computational magneto-static analysis is performed to optimize the size and placement of the interlocks 24, and to manipulate the overall plan geometry of the lamination 12, so as to provide for minimizing the perturbation of the optimal flux path(s) therein during simulated operation thereof, wherein the optimal flux path(s) is determined for the lamination 12 absent any interlocks 24.

Then, from step (2306), steps (2302) and (2304) are repeated until associated design, magnetic performance, and manufacturing criteria are all satisfied simultaneously, after which, the process completes with step (2008).

For example, referring to FIGS. 3a, 4a and 24, in one set of embodiments, the interlock locations 22 are at each of the junctions 34 between a radially-extending leg 32 and an associated outer ring structure 36 of the magnetic core 10, wherein adjacent portions 38 of the laminations 12 that abut each interlock 24 provide a sufficient amount of material for the associated magnetic flux to pass therethrough, so that the magnetic flux proximate to the interlock 24 does not substantially interact with the interlock 24.

More particularly, referring to FIG. 24, in accordance with a seventh embodiment of the second aspect of a lamination 12 of a magnetic core 10, regions 40 of maximum flux density within the magnetic core 10—for example, as determined by computational magneto-static analysis,—either with or without interlocks 24 present, are located within necked portions 42 of the corresponding radially-extending legs 32, with each region 40 having an indicated plan width L. The corresponding associated interlocks 24 are located radially-outward relative to the corresponding regions 40 of maximum flux density by a distance sufficient so that for each interlock 24 the distances 44.1, 44.2 between the interlock 24 and the radially-inward-most edges 46.1, 46.2 of the lamination 12, on each circumferential side of the interlock 24 is at least half the width L of the corresponding associated region 40 of maximum flux density, so that the magnetic flux 48 that is changing direction within the magnetic core 10 at the junction 34 of the radially-extending leg 32 and the outer ring structure 36 is not further constricted relative to the magnetic flux within either the radially-extending leg 32 or the outer ring structure 36. At the junctions 34 of the radially-extending legs 32 and the outer ring structure 36, the magnetic flux 48 tends to concentrate towards the radially-inward portion of the associated curved path followed thereby, so as to inherently reduce the interaction thereof with the associated interlock 24, the latter of which is located radially-outwards relative to the curved path of the magnetic flux 48.

Figure 25:
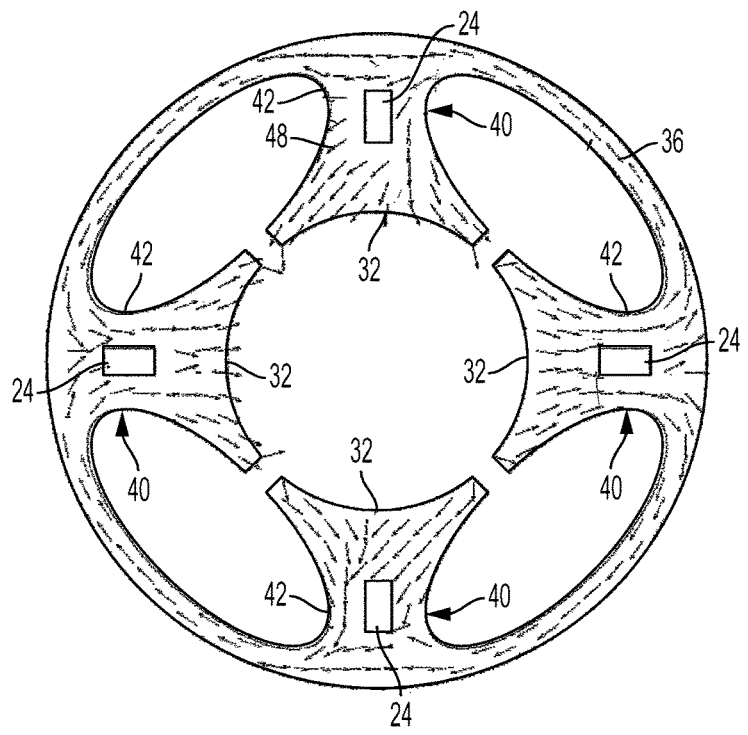
FIG. 25 illustrates a plan view of a counterpart to the seventh embodiment of the first aspect of the magnetic core as illustrated in FIG. 24, but with the interlocks located radially inward relative to the corresponding locations illustrated in FIG. 24, resulting in the interlocks being located in regions of relatively-high flux density, as illustrated by the associated simulated magnetic flux vectors.
Figure 26A:
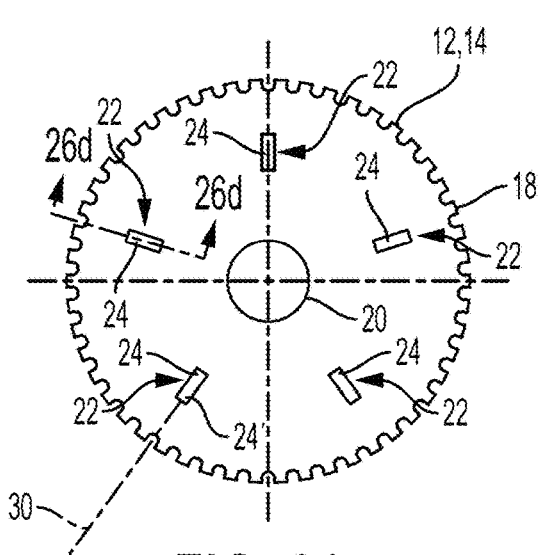
FIG. 26a illustrates a plan view of a second aspect of a magnetic core, and a plan view of a corresponding second aspect of a single lamination of the magnetic core.
Figure 26B:
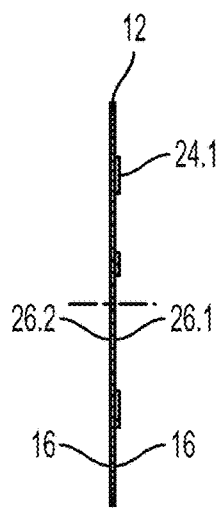
Figure 26E:
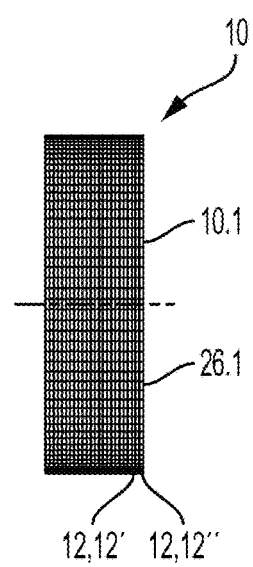
Figure 26D:
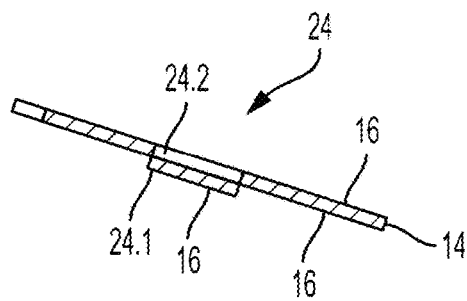
FIG. 26d illustrates a fragmentary radial cross-sectional view of an interlock portion of the single lamination of the second aspect of the magnetic core illustrated in FIGS. 26a-26c.
Figure 26C:
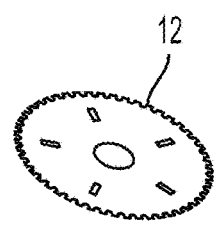
FIG. 26c illustrates an isometric view of the single lamination illustrated in FIGS. 26a and 26b.

Referring to FIG. 25, in contrast with the configuration illustrated in FIG. 24, the interlock 24 is located within the necked portion 42 of the radially-extending leg 32 of the magnetic core 10, so as to be located within the region 40 of maximum flux density in the radially-extending leg 32, causing the associated time-varying magnetic flux (i.e. dB/dt, dΦ/dt or dλ/dt) within the magnetic core 10 to interact with the associated interlock 24 in a region where the magnetic flux does not substantially change direction, which results in associated eddy-current losses within the region of the interlock 24. Accordingly, notwithstanding that the configuration of FIG. 25 possibly provides for reducing the radial extent of the outer ring structure 36 and the overall size of the magnetic core 10, the resulting associated eddy-current losses can be problematic.

Referring to FIGS. 26a-26e, in accordance with a second aspect, the interlocks 24 are located in a region of relatively constant magnetic flux without adverse effect. More particularly, in use, a pair of magnetic cores 10 would be located between axial permanent magnets (not illustrated), resulting in a relatively-constant magnetic flux within each magnetic core 10, so that the interlocks 24 located within the main flux path do not cause associated eddy-current losses.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an", and the corresponding associated definite articles "the' or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of the appended claims, and any and all equivalents thereof.

What is claimed is:

1. A method of forming a laminated magnetic core, comprising:
 a. obtaining or forming a plurality of magnetic-circuit laminations for assembly into the laminated magnetic core, wherein each magnetic-circuit lamination of said plurality of magnetic-circuit laminations comprises:
  i. a portion of a magnetic circuit; and;
  ii. a plurality of interlock elements at a corresponding plurality of interlock locations abutting said portion of said magnetic circuit, wherein each interlock element of said plurality of interlock elements is formed by partially piercing a surface of said magnetic-circuit lamination so as for form a socket portion of said interlock element and a corresponding plug portion of said interlock element at each interlock location of said plurality of interlock locations;
 b. if any of said plurality of magnetic-circuit laminations are not coated on at least one mating surface with an electrically-insulating coating, then coating said at least one mating surface of said any of said plurality of magnetic-circuit laminations with said electrically-insulating coating, wherein said at least one mating surface of said any of said plurality of magnetic-circuit laminations mates with at least one other mating surface of another lamination of said plurality of magnetic-circuit laminations during assembly of said plurality of magnetic-circuit laminations to form said laminated magnetic core;
 c. assembling said plurality of magnetic-circuit laminations so as to form said laminated magnetic core, wherein the operation of assembling comprises:
  i. aligning corresponding adjacent magnetic-circuit laminations with one another so that for each said interlock element, a corresponding plug portion of one of said corresponding adjacent magnetic-circuit laminations is aligned with, and for insertion into, a corresponding socket portion of the other of said corresponding adjacent magnetic-circuit laminations;

ii. pressing or clamping said corresponding adjacent magnetic-circuit laminations together so as to cause each said corresponding plug portion to engage with said corresponding socket portion for each of said plurality of interlock elements; and iii. repeating step c.i alone, or in combination with one or more repetitions of step c.ii, for each of said plurality of magnetic-circuit laminations of said laminated magnetic core, wherein each said magnetic-circuit lamination is constructed from an electrical-sheet steel having a sufficiently-high associated annealing temperature that would make said adjacent magnetic-circuit laminations susceptible to fusion when assembled in said laminated magnetic core, but without said electrically-insulating coating therebetween, and then annealed, and said electrically-insulating coating provides for substantially preventing said fusion of said adjacent magnetic-circuit laminations when said laminated magnetic core is annealed;

d. annealing said laminated magnetic core in a non-oxidizing environment in an oven, wherein the operation of annealing comprises:

i. increasing a temperature of said oven to a material-dependent first temperature (T1) equal to said annealing temperature;

ii. holding said material-dependent first temperature (T1) for a first period of time (H1); and iii. cooling said oven to a second temperature (T2); and e. oxidizing said laminated magnetic core in an oxidizing environment in either said oven, or a different oven, heated to a third temperature (T3) and holding said third temperature (T3) for a second period of time (H2).

2. A method of forming a laminated magnetic core as recited in claim 1, wherein said plurality of interlock elements are located so that a measure of power loss per unit mass within each of said plurality of interlock elements does not exceed said measure of power loss per unit mass for a remainder of said laminated magnetic core.

3. A method of forming a laminated magnetic core as recited in claim 1, wherein each said interlock element of said magnetic-circuit lamination is partially pierced from the same said surface of said magnetic-circuit lamination.

4. A method of forming a laminated magnetic core as recited in claim 1, wherein at least some different interlock elements of said plurality of interlock elements of at least one said magnetic-circuit lamination are partially pierced from opposing surfaces of said at least one said magnetic-circuit lamination.

5. A method of forming a laminated magnetic core as recited in claim 1, wherein for each said interlock element of said plurality of interlock elements, a distance between an edge of said magnetic-circuit lamination and said interlock element is at least half the minimum width of an associated magnetic-flux path at a location of maximum flux density proximate to said interlock element, for said associated magnetic-flux path conducting magnetic flux that varies with time.

6. A method of forming a laminated magnetic core as recited in claim 1, wherein said electrically-insulating coating comprises magnesium methylate.

7. A method of forming a laminated magnetic core as recited in claim 1, further comprising coating said at least one mating surface of at least a portion of said plurality of magnetic-circuit laminations with said electrically-insulating coating prior to the operation of assembling said plurality of magnetic-circuit laminations so as to form said laminated magnetic core.

8. A method of forming a laminated magnetic core as recited in claim 1, wherein said annealing temperature is at least 760 degrees Celsius.

9. A method of forming a laminated magnetic core as recited in claim 1, wherein said plurality of interlock elements are designed and located in accordance with an interlock design process comprising:

a. physically sizing each of said plurality of interlock elements associated with said magnetic-circuit lamination, so as to provide for sufficient geometry to provide for repeatable staking performance when said laminated magnetic core is mass produced, and so as to provide for sufficient planar area to enable consistent positioning and retention of adjacent laminations of said plurality of magnetic-circuit laminations relative to one another during assembly of said laminated magnetic core; and b. locating and sizing each of said plurality of interlock elements, and adjusting the geometry thereof, so as to provide for minimizing or nearly minimizing a disruption to associated magnetic flux paths relative to an embodiment without said plurality of interlock elements.

10. A method of forming a laminated magnetic core as recited in claim 9, wherein the operation of locating and sizing each of said plurality of interlock elements is responsive to an associated magneto-static analysis of either or both said laminated magnetic core or said magnetic-circuit lamination.

11. A method of forming a laminated magnetic core as recited in claim 1, wherein the operation of forming said plurality of magnetic-circuit laminations comprises:

a. blanking said plurality of magnetic-circuit laminations from said electrical-sheet steel;

b. coating at least one surface of said electrical-sheet steel, or at least one said surface of each of said plurality of magnetic-circuit laminations blanked therefrom, either before or after the operation of blanking, with an electrically-insulating coating sufficient to prevent said fusion of non-pierced surfaces of said plurality of magnetic-circuit laminations when assembled to form said laminated magnetic core and subsequently annealed; and c. partially piercing each of said plurality of magnetic-circuit laminations at said plurality of interlock locations so as to form said plurality of interlock elements.

12. A method of forming a laminated magnetic core as recited in claim 11, wherein said electrically-insulating coating comprises magnesium methylate.

* * * * *